United States Patent

[11] 3,585,581

| [72] | Inventors | Kenneth E. Aune<br>Burnsville;<br>Gerald F. Jacobs, New Hope; Gary W.<br>Spence, New Hope, all of, Minn. |
|---|---|---|
| [21] | Appl. No. | 843,335 |
| [22] | Filed | July 22, 1969 |
| [45] | Patented | June 15, 1971 |
| [73] | Assignee | Honeywell Inc.<br>Minneapolis, Minn. |

[54] SEISMIC SENSOR APPARATUS
5 Claims, 3 Drawing Figs.

| [52] | U.S. Cl. | 340/16,<br>340/258, 340/261 |
|---|---|---|
| [51] | Int. Cl. | G08b 13/100 |
| [50] | Field of Search | 340/15, 16,<br>258 D, 261 |

[56] References Cited
UNITED STATES PATENTS
3,109,165  10/1963  Bagno..........................  340/15 X

*Primary Examiner*—Richard A. Farley
*Attorneys*—Charles J. Ungemach, Ronald T. Reiling and Albin Medved

ABSTRACT: Discriminating, range limited, seismic sensor apparatus particularly applicable to intrusion detection systems. The preferred embodiment of the invention provides discrimination between vehicular and personnel travel in the area of the sensor. Discrimination and range limiting is provided by sensing seismic disturbances at two frequencies, relying upon the frequency-dependence of attenuation of seismic waves.

PATENTED JUN 15 1971 3,585,581

INVENTORS
KENNETH E. AUNE
GERALD F. JACOBS
GARY W. SPENCE
BY Albin Medved
ATTORNEY said
SEISMIC SENSOR APPARATUS

BACKGROUND OF THE INVENTION

The present invention pertains to the art of electrical communications and, more particularly, to systems for receiving compressional waves and for determining the presence of one object with respect to another. (Class 340-16)

DESCRIPTION OF THE PRIOR ART

The use of geophones and similar seismic sensing devices for detecting the intrusion of vehicles or personnel is well known in the prior art. However, difficulties with devices of this type are the lack of discrimination between different types of intruders. Systems have been developed utilizing the complex banks of multiband-pass filters to provide this discrimination. The complexity of filtering systems necessary to discriminate between, for example, a walking intruder and a tank result in high cost.

It is an object of the present invention to provide a simple and reliable seismic sensing system for discrimination between seismic signals of different character.

It is a further object of the present invention to utilize comparison of seismic signal levels at two separated frequencies for range discrimination.

SUMMARY OF THE INVENTION

The present invention provides a range-limited seismic sensing system which discriminates between vehicular and human intrusions. Operation of the system depends upon the fact that seismic energy is attenuated in a medium at a rate approximately proportional to frequency squared. (Sound and Ultrasound Waves, V. A. Krasilnikov, Israel Program for Scientific Translations, Jerusalem, 1963, p. 48). The high frequency signals of any seismic disturbance will therefore be attenuated more than the low frequency signals produced by the same source.

Restriction of the range of detection is therefore accomplished by use of the high frequency signals. Discrimination between men and vehicles, for example, is accomplished through use of the low frequencies.

Frequency signatures characteristic of a walking man comprise a series of high frequency disturbances corresponding to each footfall. A vehicular disturbance has a more constant level frequency signature with a significant amplitude in the lower frequency ranges.

Rectification and filtering of the signal corresponding to a walking human produces a series of pulses. By shaping and counting the pulses, discrimination between a walking human and other frequency signatures is achieved.

A vehicle signature, after rectification and filtering, is represented by a nearly continuous envelope. The present invention provides a low frequency channel to detect this continuous envelope and inhibit a logic circuit.

DESCRIPTION OF THE PREFERRED EMBODIMENT

Figure 1:
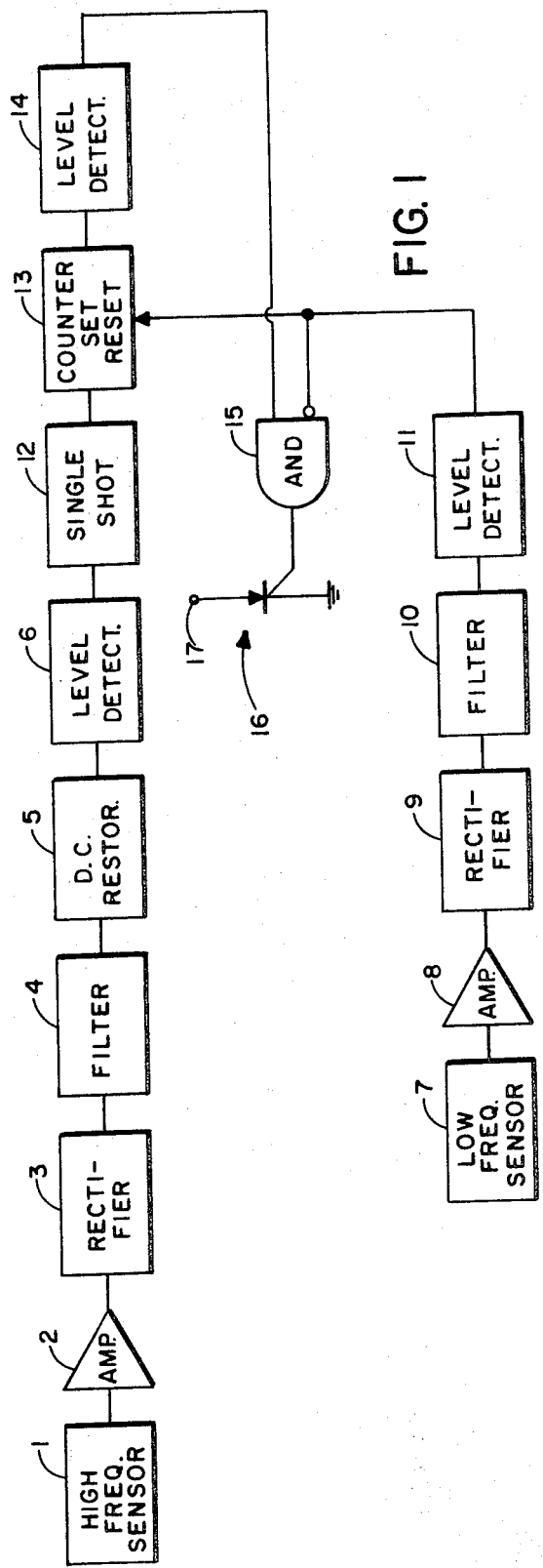
FIG. 1 is a block diagram of the preferred embodiment of the present invention.

Referring to FIG. 1, a piezoelectric sensor designed for 100 Hz. constitutes a high frequency sensor 1. The output of the sensor is conditioned by amplifier 2, rectifier 3, filter 4, and is applied to the input of a DC restoration circuit 5. The output of the DC restoration circuit 5 is connected to the input of a level detector 6 which has its output connected to a single shot multivibrator 12. The multivibrator output drives the "set" input of a counter 13 which has its output connected to a level detector 14. The output of the level detector 14 is connected to an AND circuit 15.

A low frequency sensor 7 comprises a 30 hertz piezoelectric device similar to sensor 1. The output from the low frequency sensor is conditioned by amplifier 8, rectifier 9, filter 10, and is applied to level detector 11. The output of the level detector 11 is connected to the "reset" input of counter 13 and to the "not" input of the "AND" circuit 15.

The output of AND circuit 15 is connected to the gate of an SCR 16 having its cathode connected to a point of reference potential and having its anode connected to a control point 17.

OPERATION

Figure 3:
FIG. 3 illustrates a typical frequency signature for a tank.
Figure 2:
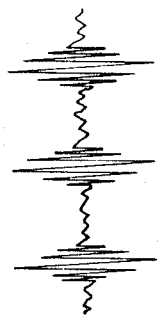
FIG. 2 illustrates a typical frequency signature for a walking man.

Operation of the preferred embodiment will be explained with reference to the sample frequency signatures presented in FIGS. 2 and 3.

Since low frequencies will be transmitted farther than the high frequencies for a given amplitude, an approaching tank will cause a response in the low frequency sensor 7 before the high frequency components are detected by the high frequency sensor 1. The output of the low frequency sensor 7 will have an essentially constant amplitude due to the periodic nature of the tank signature. This output is amplified in amplifier 8, rectified and filtered in circuits 9 and 10 respectively, and applied to the input of level detector 11. The level detector, upon the tank reaching a predetermined distance from the sensor device, will provide an output which resets counter 13 and applies a "zero" signal to AND circuit 15, thereby inhibiting any output. As the tank approaches, the high frequency signals will begin to be received by the sensor 1. Through amplification, rectification, and filtering, the high frequency signal will eventually trigger level detector 6. However, due to the continuous nature of the high frequency signal the single shot 12 will be actuated only once, causing the counter 13 to count a "1." Depending on the initiation level for the level detector 14, a certain number of counts must be made before an output from level detector 14 results. Although high frequency pulses may be received in sufficient number to provide an output at level detector 14, the output of AND circuit 15 has already been inhibited by the output of level detector 11.

Considering the operation of the circuit of FIG. 1 in response to a man walking, the high frequency sensor will be actuated by the pulses of the footfalls at a predetermined distance. The low frequency portion of the circuit will not be actuated and the level detector 11 will not inhibit the AND circuit 15.

The high frequency pulses from the output of sensor 1 are amplified, rectified, and filtered. The filtered signal is applied to the input of a DC restoration circuit 5 whose output is coupled through a level detector 6 to the single shot multivibrator 12. At each footfall, when the man is within a predetermined range of the sensor 1, the single shot 12 will be triggered which in turn triggers the counter 13. After a predetermined count level, level detector 14 provides an output to AND circuit 15. Providing that low frequency signals are below a preset threshold, the inverted input to AND circuit 15 will be a "1" (for a zero output at level detector 11) and the SCR 16 will be turned on with a forward bias on terminal 17, connecting terminal 17 to ground, triggering a desired response.

We claim:
1. Seismic sensor apparatus, comprising:
   a high frequency seismic sensor;
   a low frequency seismic sensor;
   counter means, connected to said high frequency sensor, for counting high frequency seismic pulses;
   control means, connected to said counter means and to said low frequency seismic sensor, for signalling after a predetermined number of high frequency pulses are received in the absence of low frequency signals.
2. Intrusion detection apparatus, comprising:
   first seismic sensor means for detecting seismic disturbances corresponding to personnel movement in the area of said sensor;

second seismic sensor means for detecting disturbances corresponding to vehicular movement, operating at a lower frequency than said first seismic sensor means; and control means, connected to said first and second seismic sensor means, for signalling an intrusion when said first seismic sensor means detects personnel and said second sensor means does not detect a vehicle.

3. Apparatus of claim 2 where in said first seismic sensor means comprises:
 a seismic sensor;
 amplifier means for amplifying a signal from said seismic sensor;
 rectifier means for rectifying the amplified signal;
 threshold detector means connected to said rectifier means; and
 counter means, connected to said threshold detector means, for counting each time a signal exceeds the detector threshold.

4. Apparatus of claim 2 wherein said second seismic sensor means comprises:
 a seismic sensor;
 amplifier means for amplifying a signal from said seismic sensor;
 rectifier means for rectifying the amplified signal; and
 threshold detector means connected to said rectifier means.

5. Intrusion detection apparatus comprising:
 a high frequency channel, comprising:
  seismic sensor means;
  threshold detector means connected to said seismic sensor means;
  counter means connected to the output of said threshold detector means, providing an output signal with a level depending on the number of high frequency seismic disturbances counted;
  second threshold detector means connected to the output of said counter means for providing an output when a predetermined count is reached;
 a low frequency channel, comprising:
  seismic sensor means,
  threshold detector means connected to the output of said seismic sensor means for providing an output when the seismic signals sensed exceed a certain level;
 logic means for actuating an indicator when there is an output from said high frequency channel and no output from said low frequency channel.